United States Patent
Chen et al.

(10) Patent No.: US 7,954,983 B2
(45) Date of Patent: Jun. 7, 2011

(54) OPTICAL COMPONENT, MANUFACTURING METHOD OF THE SAME AND BACKLIGHT MODULE

(75) Inventors: Yan-Zuo Chen, Taoyuan County (TW); Wen-Feng Cheng, Taoyuan County (TW); Chih-Wei Huang, Taoyuan County (TW); Chun-Wei Wang, Taoyuan County (TW); Cheng Lin, Taoyuan County (TW)

(73) Assignee: Entire Technology Co., Ltd., Taoyuan County (TW)

( * ) Notice: Subject to any disclaimer, the term of this patent is extended or adjusted under 35 U.S.C. 154(b) by 229 days.

(21) Appl. No.: 12/421,816

(22) Filed: Apr. 10, 2009

(65) Prior Publication Data

US 2010/0259950 A1 Oct. 14, 2010

(51) Int. Cl.
*F21V 5/00* (2006.01)
(52) U.S. Cl. ....... 362/309; 362/607; 362/617; 362/97.2; 362/308; 362/328
(58) Field of Classification Search ........ 362/97.1–97.4, 362/606, 607, 617, 619, 308, 309, 328, 329, 362/333, 249.01, 225, 335, 336
See application file for complete search history.

(56) References Cited

U.S. PATENT DOCUMENTS

| | | | |
|---|---|---|---|
| 7,309,149 B2 | 12/2007 | Lee et al. | |
| 7,364,341 B2 * | 4/2008 | Parker et al. | 362/620 |
| 7,374,328 B2 | 5/2008 | Kuroda et al. | |
| 7,576,810 B2 * | 8/2009 | Chang | 349/64 |

* cited by examiner

*Primary Examiner* — Thomas M Sember
(74) *Attorney, Agent, or Firm* — McGinn IP Law Group, PLLC

(57) ABSTRACT

The present invention provides an optical component, a manufacturing method of the same and a backlight module including the foregoing optical component. The optical component includes a plurality of microstructures and reflecting members. The microstructure is extended along a first direction and arranged along a second direction on a light exit surface, and a distance between the first curve and the second curve in the second direction is not equal and not parallel, and a distance between the second curve and another first curve in the second direction being not equal and not parallel. Each reflecting member is extended along the first direction and arranged along the second direction on a light entrance surface and the position of each reflecting member is among two microstructures. Each of the reflecting members to the light entrance surface has a thickness t, a length of the microstructure in the second direction is a width P, the optical component has a refractive index n, and t, P and n satisfy a formula of $\tan^{-1}(P/(10t)) > \sin^{-1}(1/n)$. When the design of the optical component satisfies the foregoing formula, it will achieve better optical performance.

10 Claims, 9 Drawing Sheets

OPTICAL COMPONENT, MANUFACTURING METHOD OF THE SAME AND BACKLIGHT MODULE

BACKGROUND OF THE INVENTION

1. Field of the Invention

The present invention relates to an optical component, a manufacturing method of the same and a backlight module. More particularly, the present invention relates to an optical component having microstructures and reflecting members, a manufacturing method of the same and a backlight module.

2. Description of the Prior Art

FIG. 1 is a cross-sectional view showing a portion of a brightness enhancement film disclosed in U.S. Pat. No. 7,309, 149. Referring to FIG. 1, there is a plurality of reflecting members 13' on a light entrance surface 12' of a brightness enhancement film 1'. After a first light L1, a second light L2 and a third light L3 are incident upon the light entrance surface 12' of the brightness enhancement film 1', the first light L1 is refracted toward a front of the brightness enhancement film 1', the second light L2 is reflected from the reflecting member 13', and the third light L3 is reflected from the reflecting member 13' or a prism member 11'. The reflected second light L2 and the reflected third light L3 are again reflected by a reflecting plate (not shown) that is positioned under the brightness enhancement film 1' so that the second light L2 and the third light L3 are recycled.

Because the arrangement of the reflecting members 13', the lights incident upon the light entrance surface are less tend to be refracted toward the edges of the brightness enhancement film; hence, a user perceives higher luminance while observing in front of the brightness enhancement film 1'.

In U.S. Pat. No. 7,309,149, it is defined that the width of the reflecting member 13' is less than or equal to two-thirds of a distance of adjacent prism members 11', but it is not defined for a distance and a thickness of the reflecting members 13' so that those skilled in the art cannot further improve the design according to U.S. Pat. No. 7,309,149. In addition, because the prism members 11' are arranged parallel to each other on the brightness enhancement film 1', and a plurality of pixel electrodes are also arranged parallel to each other on a liquid crystal display (LCD) panel, it is easy to cause a visible moire pattern.

Therefore, it is an issue for those skilled in the art to solve the foregoing problem.

SUMMARY OF THE INVENTION

The present invention provides an optical component, which can effectively eliminate the moire pattern and further provides a limitation for the distance and the thickness of the reflecting members so that those skilled in the art can further improve the design.

To achieve the foregoing and other objects, the present invention provides an optical component having a light exit surface and a light entrance surface on which at least one light source emitting lights to generate at least one optical path in the optical component is disposed. The optical component includes a plurality of microstructures and a plurality of reflecting members. The microstructures are extended along a first direction and arranged along a second direction on the light exit surface. Each of the microstructures has a top, and the tops are disposed on the light exit surface to form a plurality of first curves and a plurality of second curves adjacent to each other. The first curves and the second curves are extended along the first direction, a distance between the first curve and the second curve in the second direction is not equal and not parallel, and a distance between the second curve and another first curve in the second direction is not equal and not parallel.

In addition, each of the reflecting members is extended along the first direction and arranged along the second direction on the light entrance surface, and the position of each of the reflecting members is among two microstructures. Each of the reflecting members to the light entrance surface has a thickness t, a length of the microstructure in the second direction is a width P, and the optical component having a refractive index n, and t, P and n satisfy a formula of $\tan^{-1}(P/(10t)) > \sin^{-}(1/n)$.

The optical path is incident from the light entrance surface, and the optical path is controlled by the thickness of the reflecting members and converged by the microstructures on the light exit surface.

In the present optical component, a cross-sectional outline of the microstructure in the second direction is an arc, a radius of curvature of the arc is R, a distance between the first curve and the second curve in the second direction is D, and R and D satisfy a formula of $0.5R < D < 3R$.

In the present optical component, a focal length FD of the microstructure and the width P of the bottom of the microstructure satisfy a formula of $0.25 < FD/P < 2.4$.

To achieve the foregoing and other objects, the present invention provides a manufacturing method of an optical component adapted to manufacture the foregoing optical component. The manufacturing method of the optical component includes the following steps. First, a transparent substrate is provided, and a forming resin is formed on one surface of the transparent substrate. Next, a mold having a surface with a plurality of forming patterns disposed thereon is provided. The shape of the forming patterns is corresponding to that of the microstructures of the optical component. Next, the mold impresses on the forming resin, and the impressed forming resin is cured to form the microstructures. Next, a photoresist layer is formed on another surface of the transparent substrate. Next, a structure area is formed by performing an exposure and development process for the photoresist layer, and the photoresist layer is removed except the photoresist layer of the structure area. Next, a reflecting material layer is formed over the structure area. Next, the photoresist layer of the structure area and the reflecting material layer above the structure area are removed to form the reflecting members.

To achieve the foregoing and other objects, the present invention provides a backlight module. The backlight module includes an optical sheet, at least one light source and the foregoing optical component. The optical component is disposed beside a light exit side of the optical sheet.

In the present backlight module, the optical sheet includes a diffusion plate or a light guide plate.

In the present backlight module, the light source includes a flat fluorescent lamp (FFL), an external electrode fluorescent lamp (EEFL), a hot cathode fluorescent lamp (HCFL), a cold cathode fluorescent lamp (CCFL) or a light emitting diode (LED).

Compared with the prior art, the optical component of the present invention can effectively eliminate the moire pattern and further provides a limitation for the distance and the thickness of the reflecting members so that those skilled in the art can further improve the design.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
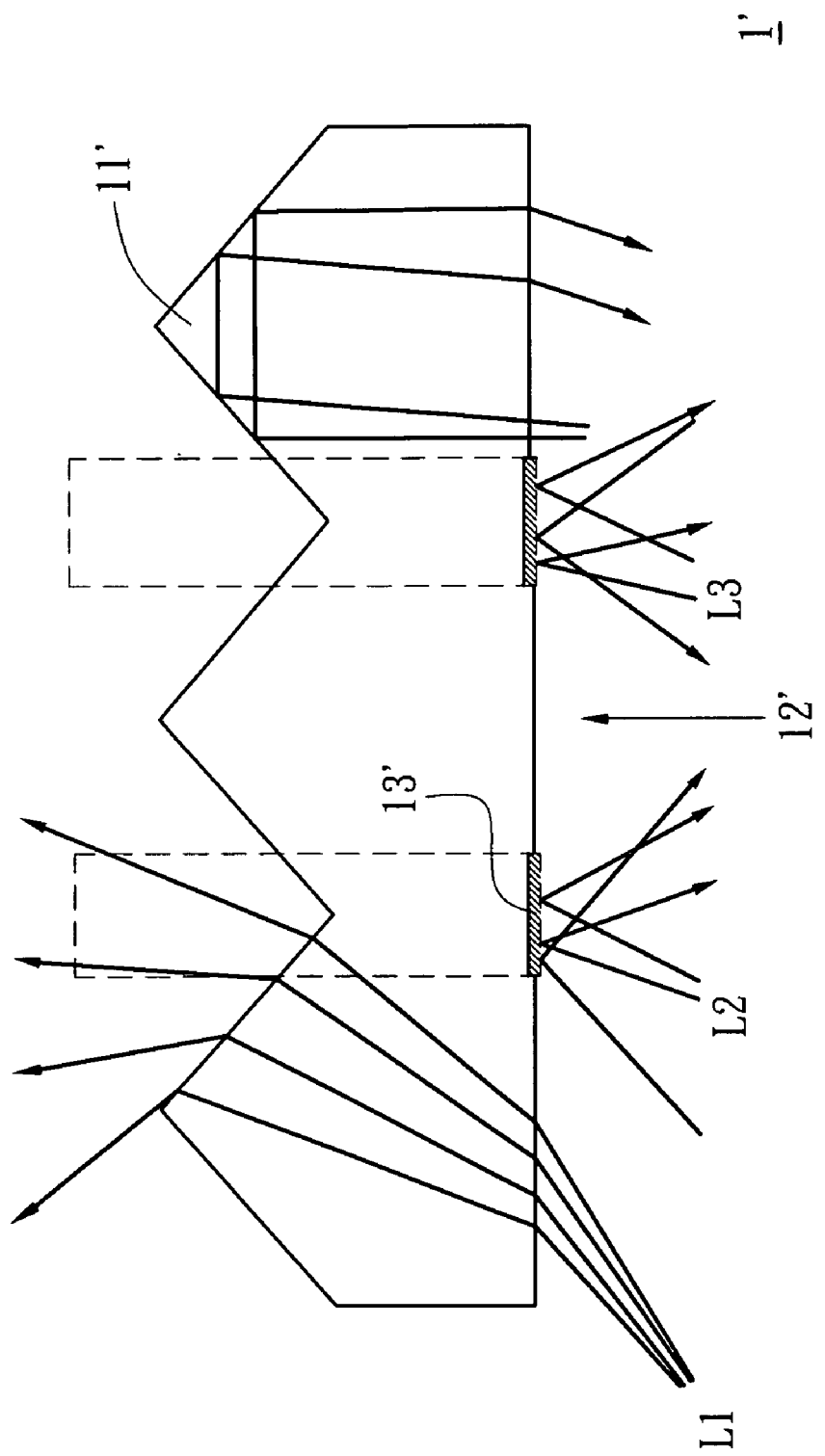
FIG. 1 is a cross-sectional view showing a portion of a brightness enhancement film disclosed in U.S. Pat. No. 7,309,149.

Reference will now be made in detail to the preferred embodiments of the present invention, examples of which are illustrated in the accompanying drawings. Wherever possible, the same reference numbers are used in the drawings and the description to refer to the same or like parts.

In following embodiments, an x-axis direction represents the second direction and a y-axis direction represents the first direction. Those skilled in the art would recognize that it is for convenience of explanation, but not limited to the first direction and the second direction.

Figure 2:
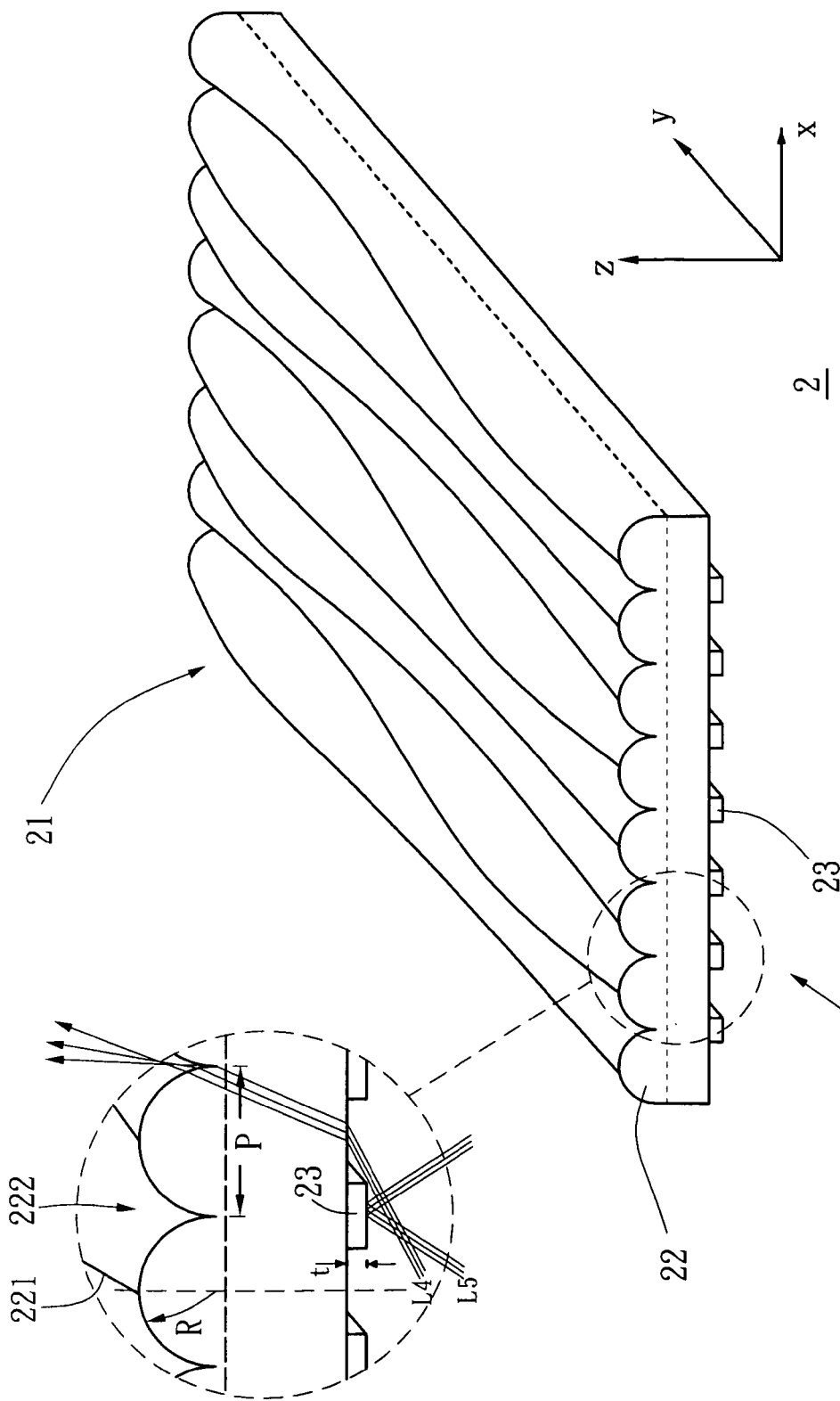
FIG. 2 is a perspective view showing an optical component according to a first embodiment of the present invention.

Referring to FIG. 2, it is a perspective view showing an optical component according to a first embodiment of the present invention. An optical component 2 is roughly sheet-shaped and, for example, disposed over a diffusion plate of a direct-type backlight module, i.e., disposed beside a light exit side of the diffusion plate. There is a plurality of microstructures 22 on a light exit surface 21 of the optical component 2. The microstructures 22 are arranged along the x-axis direction on the light exit surface 21, and each of the microstructure 22 has a top 221. The microstructures 22 are used for converging the optical paths of the lights.

In addition, there is a plurality of reflecting members 23 disposed on a light entrance surface 24 of the optical component 2. The reflecting members 23 are arranged along the x-axis direction on the light entrance surface 24, and the material of the reflecting members 23 is titanium dioxide (TiO$_2$) or magnesium oxide (MgO). And, the position of each of the reflecting members 23 is corresponding to a groove 222 formed between two microstructures 22. Each of the reflecting members to the light entrance surface has a thickness t, a length of the microstructure 22 in the x-axis direction is a width P, the refractive index of the optical component 2 is n, and t, P and n satisfy a formula:

$$\tan^{-1}(P/(10t)) > \sin^{-1}(1/n) \tag{1}$$

It is known from FIG. 2 that a portion light L4 is incident from the light entrance surface 24, and a portion light L5 is reflected from the reflecting member 23. The optical paths of the lights can be controlled by the thickness t of the reflecting members 23, and the optical path of the light L4 can be converged by the microstructures 22 on the light exit surface 21.

Figure 3:
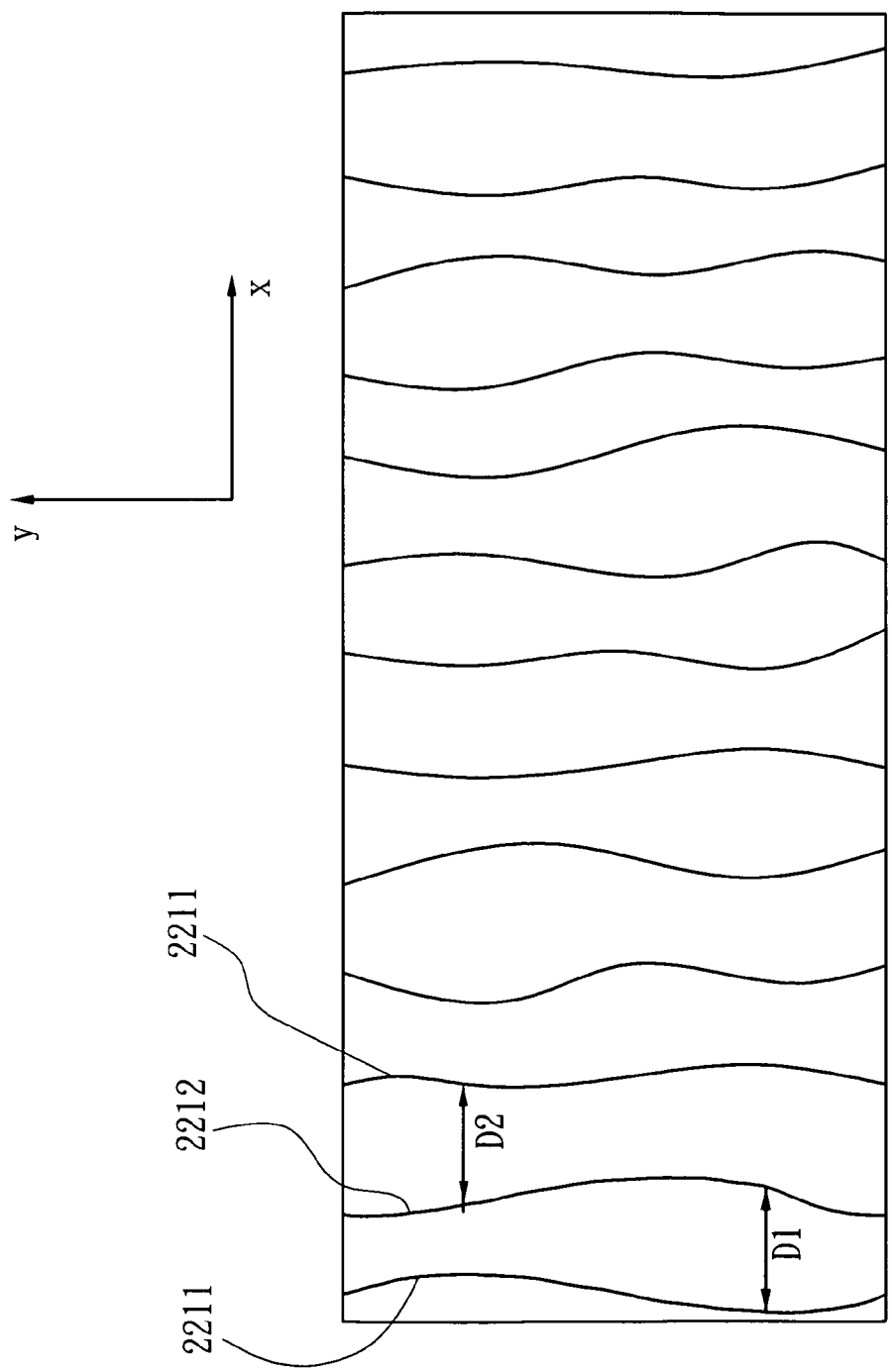
FIG. 3 is a plan view showing the projection of the tops on an xy-plane.

Referring to FIGS. 2 and 3, FIG. 3 is a plan view showing a plurality of curves formed by projecting the tops on an xy-plane. It is known from FIG. 2 that the microstructure 22 is roughly extended along the y-axis direction and an extension path of the microstructure 22 is in curved shape. The tops 221 of the microstructures 22 are projected on an xy-plane to form a plurality of varied curves. Here, it is defined that the curves in odd positions from left to right are the first curves 2211 and the curves in even positions from left to right are the second curves 2212. It is noted that the curves are divided into the first curves 2211 and the second curves 2212 for convenience of explanation, but not limited to the first curves 2211 all having the same curved shape and the second curves all having the same curved shape.

Referring to FIG. 3, the first curves 2211 and the second curves 2212 are not parallel. Each of the second curves 2212 is positioned in between two of the first curves 2211. A distance between the first curve 2211 beside the left side of the second curve 2212 and the second curve 2212 is D1, and a distance between the first curve 2211 beside the right side of the second curve 2212 and the second curve 2212 is D2. The distance D1 and the distance D2 are varied along the y-axis direction, and the distance D1 and the distance D2 are not equal.

A cross-sectional outline of the microstructure 22 in the x-axis direction is an arc. The radius of curvature of the arc is R. No matter it is the distance D1 or the distance D2, it is generally called the distance D, and D and R satisfy a formula:

$$0.5R < D < 3R \tag{2}$$

In addition, the focal length of the microstructure 22 is FD (not shown), and FD and P satisfy a formula:

$$0.25 < FD/P < 2.4 \tag{3}$$

Because the pixel electrodes are arranged parallel to each other on the LCD panel and the microstructures 22 in the embodiment are extended in curved shape, it is not easy to cause a visible moire pattern.

In addition, the foregoing optical component 2 is simulated by a computer. In the simulation, the width P of the bottom of the microstructure 22 is set to 185 μm, the refractive index n of the optical component 2 is set to 1.63, and the thickness t of the reflecting member 23 is varied to obtain the following table:

|  | simulation state | | | | |
|---|---|---|---|---|---|
|  | 1 | 2 | 3 | 4 | 5 |
| thickness t (μm) | 43 | 33 | 20 | 13 | 4 |
| intensity | 0.68 | 0.83 | 1.0 | 1.0 | 1.0 |
| ½ viewing angle (°) | 12.4 | 14.1 | 16.5 | 17.8 | 19.4 |

In the table, the "intensity" represents the light intensity perceived in front of the optical component 2, and "½ viewing angle" represents the viewing angle at which the light intensity is one half of the light intensity perceived in front of the optical component 2. It is shown that the simulation states 1 and 2 do not satisfy the formula (1), and the simulation states 3-5 satisfy the formula (1).

In summary, those skilled in the art can control the optical paths of the lights through the thickness of the reflecting members 23 and design the optical component 2 to satisfy the formula (1) to achieve better optical performance.

A manufacturing method of the foregoing optical component 2 is introduced with reference to FIGS. 4A-4E as follows. First, referring to FIG. 4A, a forming resin 22' is formed on one surface of a transparent substrate 25. The material of the transparent substrate 25 is, for example, polycarbonate, polyethylene naphthalate (PEN) or polyethylene terephthalate (PET), and the forming resin 22' is, for example, an ultraviolet-setting resin or a thermosetting resin.

Then, a roller 4 is provided. The roller 4 has a surface 41 with a plurality of forming patterns (not shown) disposed thereon. The shape of the forming patterns is corresponding to that of the microstructures 22 of the optical component 2 as shown in FIG. 2; that is, the microstructure 22 is upward convex in shape, and the forming pattern is complementally shaped and hence is downward concave in shape.

Figure 4A:
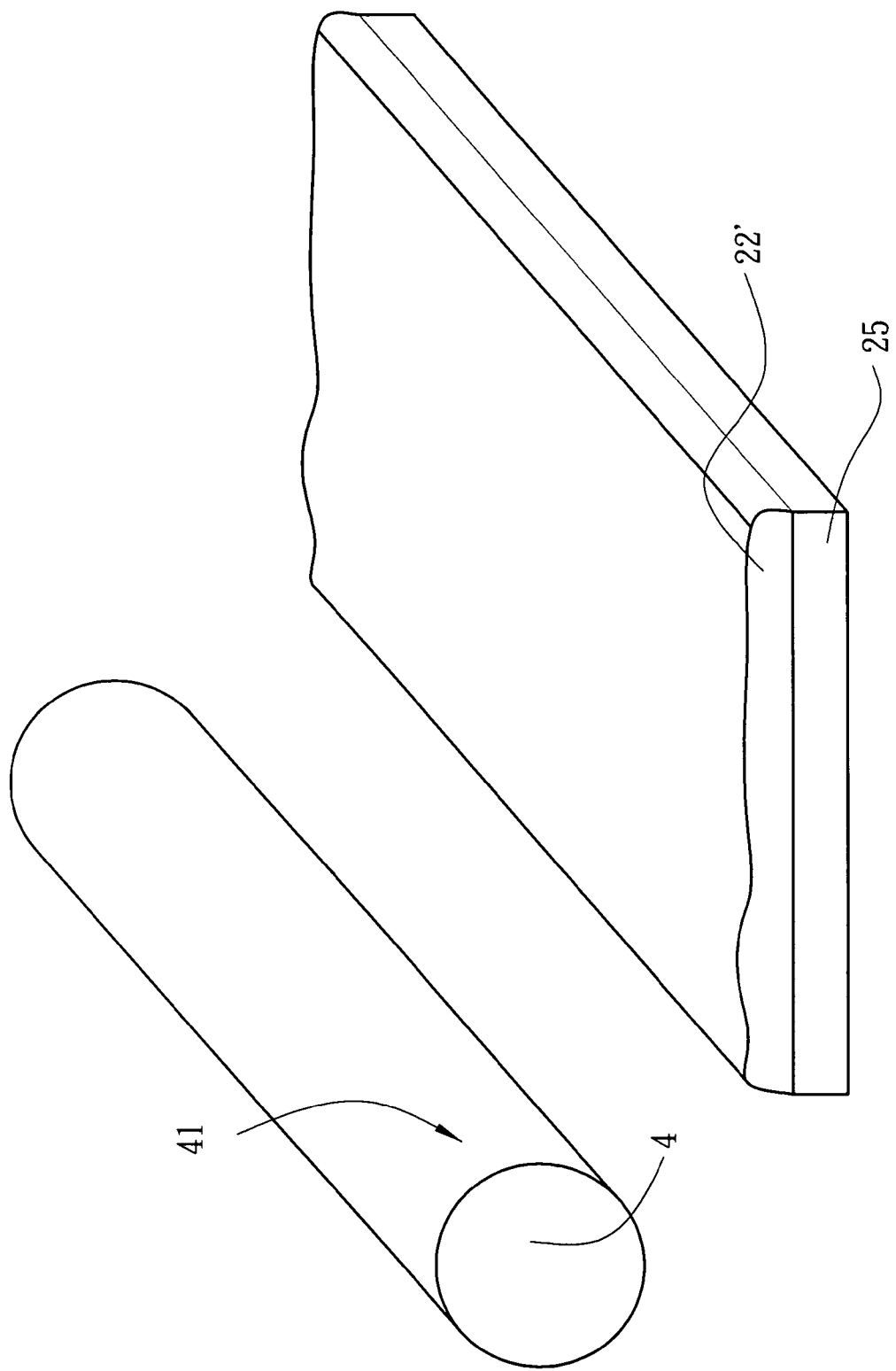
FIGS. 4A-4E are diagrams showing a manufacturing method of an optical component.
Figure 4B:
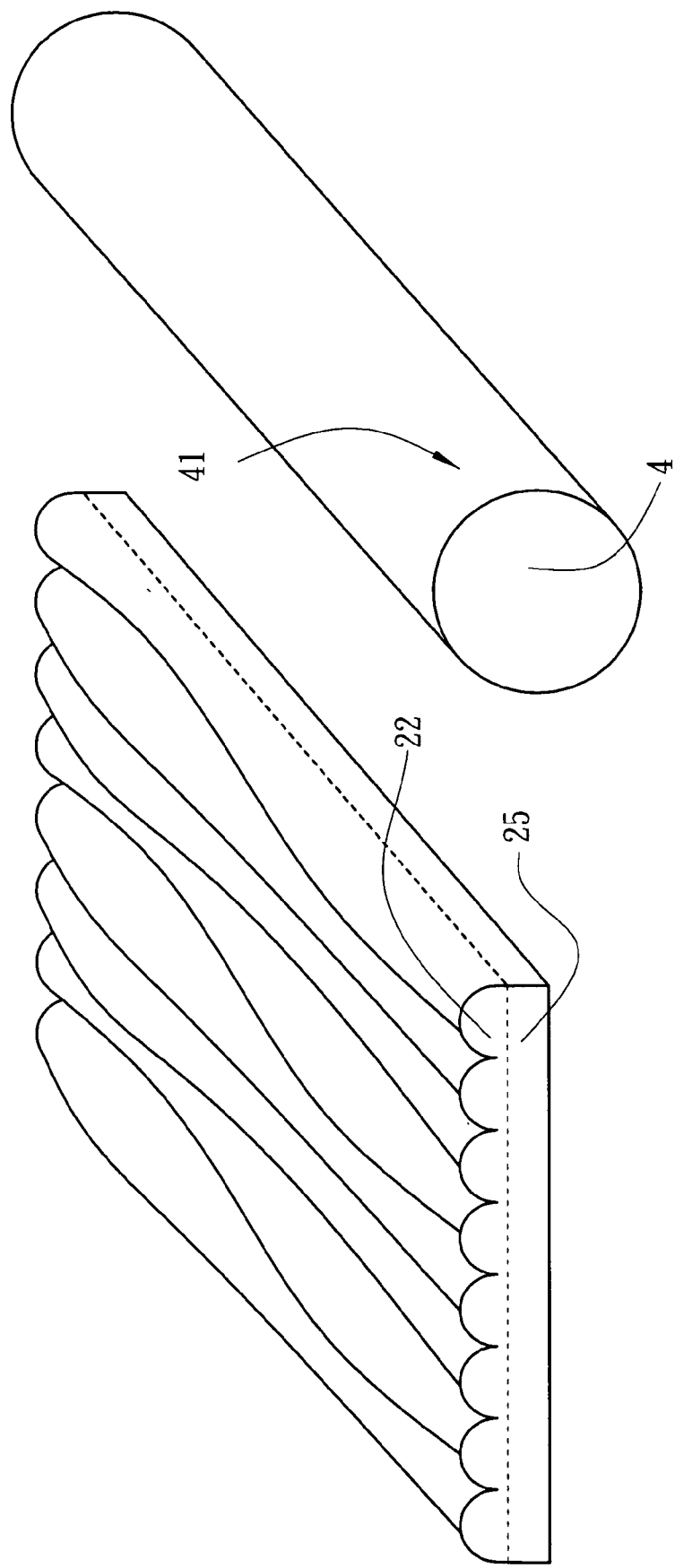

Next, referring to FIG. 4B, after the forming resin 22' is impressed by the roller 4 and the impressed forming resin is cured, the microstructures 22 are formed on the transparent substrate 25. The method for curing the forming resin 22' varies from one type of the forming resin 22' to another; for example, if the forming resin 22' is the ultraviolet-setting resin, it is cured by exposure to ultraviolet light, and if the forming resin 22' is the thermosetting resin, it is cured by exposure to heat. In addition, although the forming resin 22' is impressed by the roller 4 in the embodiment, those skilled in the art will recognize that the roller 4 can be replaced by other types of molds.

Figure 4C:
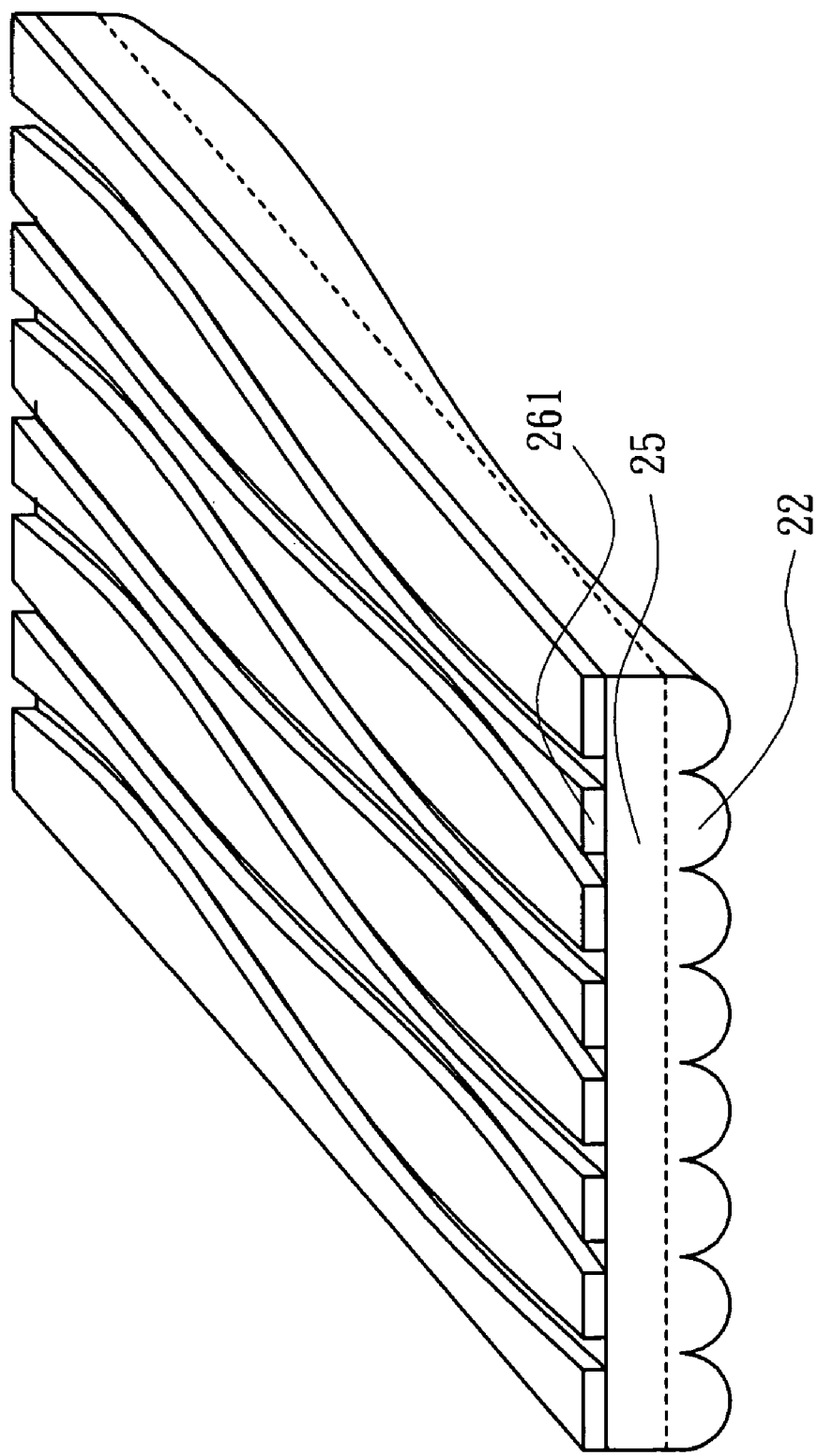

Next, referring to FIG. 4C, after the microstructures 22 are formed, a photoresist layer is formed on another surface of the transparent substrate 25. After the photoresist layer is formed, an exposure and development process is performed to form a structure area 261, and then the photoresist layer is removed except the photoresist layer of the structure area 261 by using a chemical preparation so as to only leave the structure area 261.

Figure 4D:
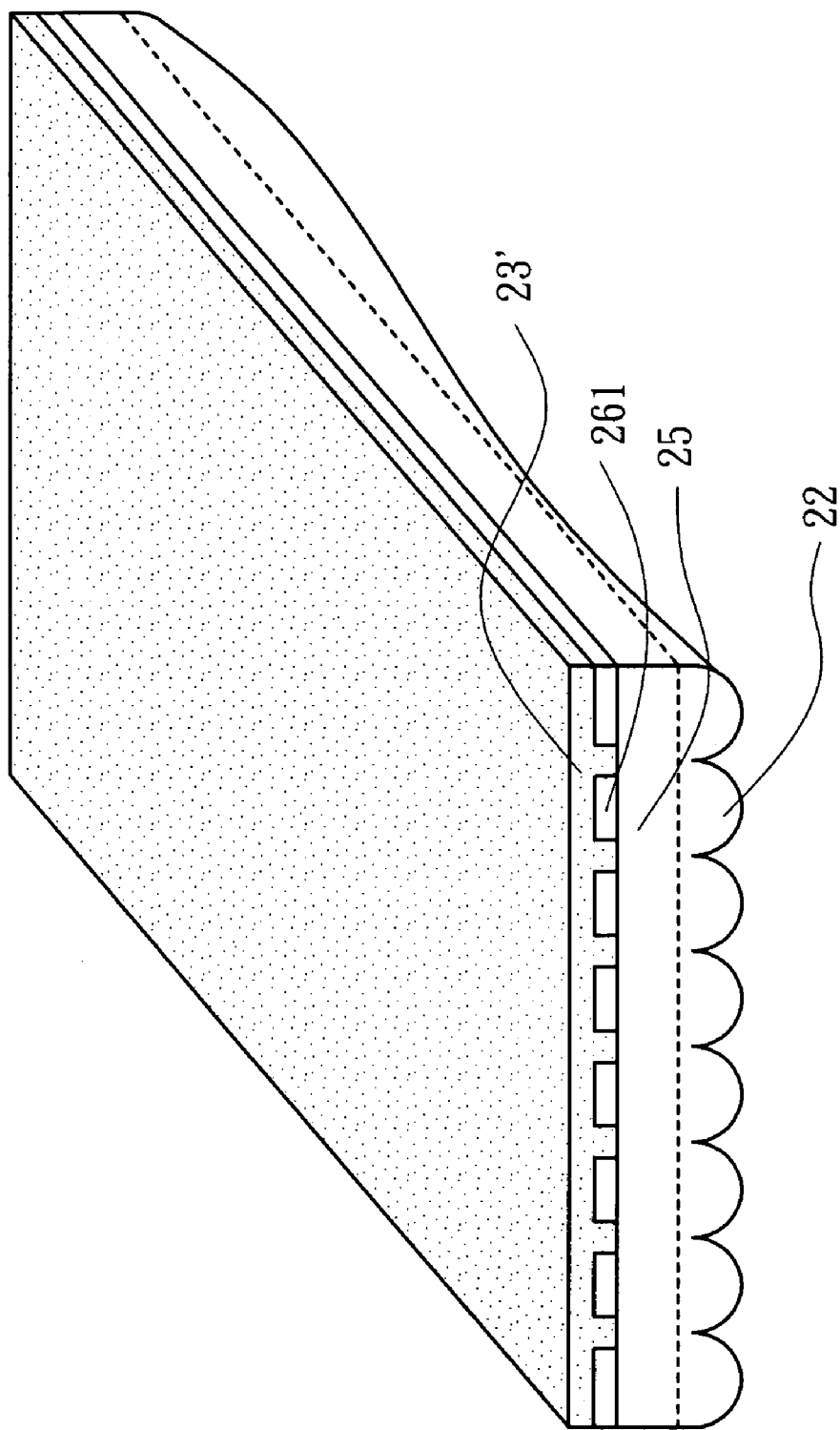
Figure 4E:
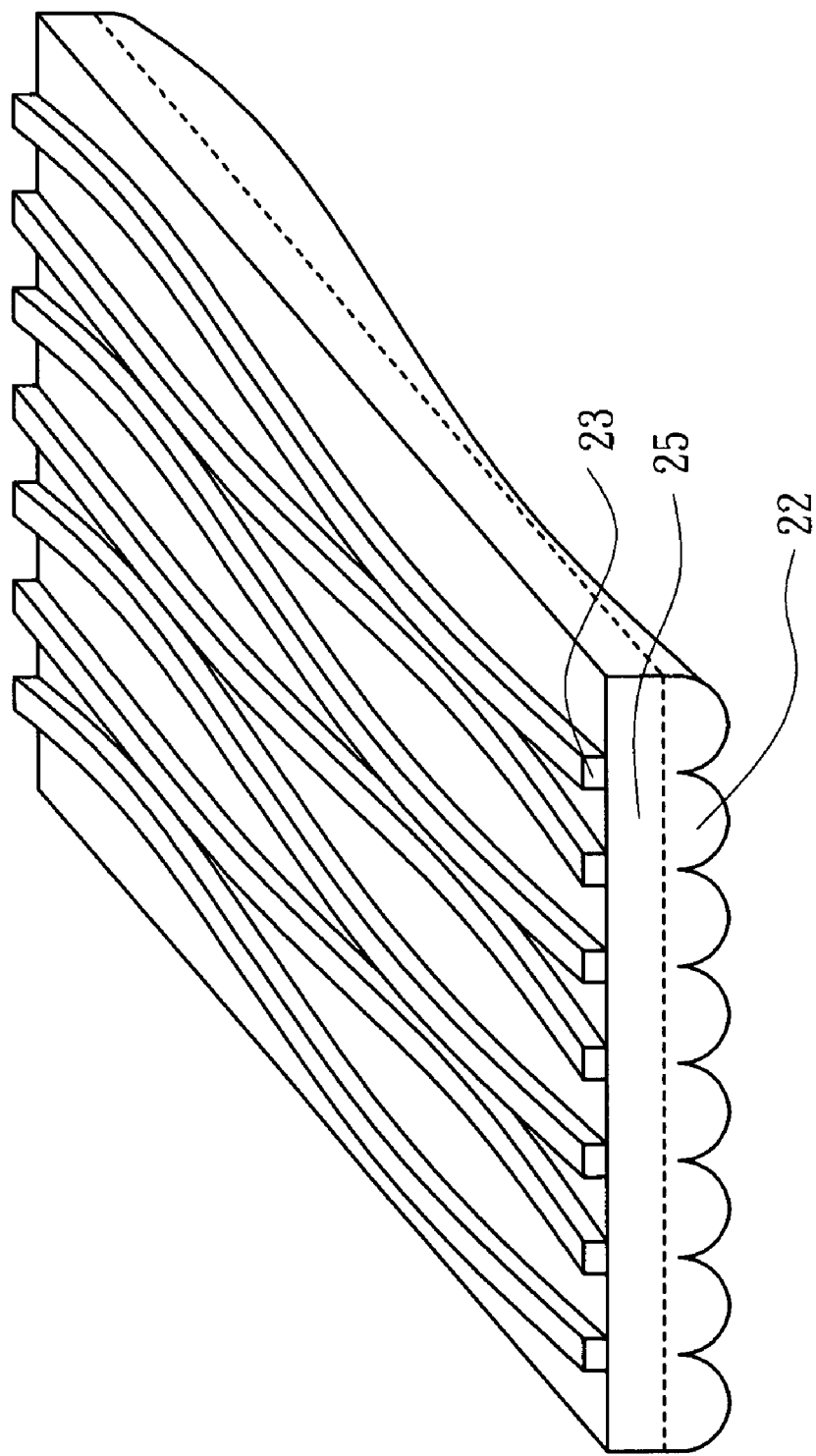

Next, referring to FIG. 4D, a reflecting material layer 23' is formed over the structure area 261, and the photoresist layer of the structure area 261 will form a bond with the reflecting material layer 23'. Next, referring to FIG. 4D, the photoresist layer of structure area 261 and the reflecting material layer 23' above the structure area 261 are removed to form the reflecting members 23. After the reflecting members 23 are formed, the optical component 2 of the present invention is finished.

Figure 5:
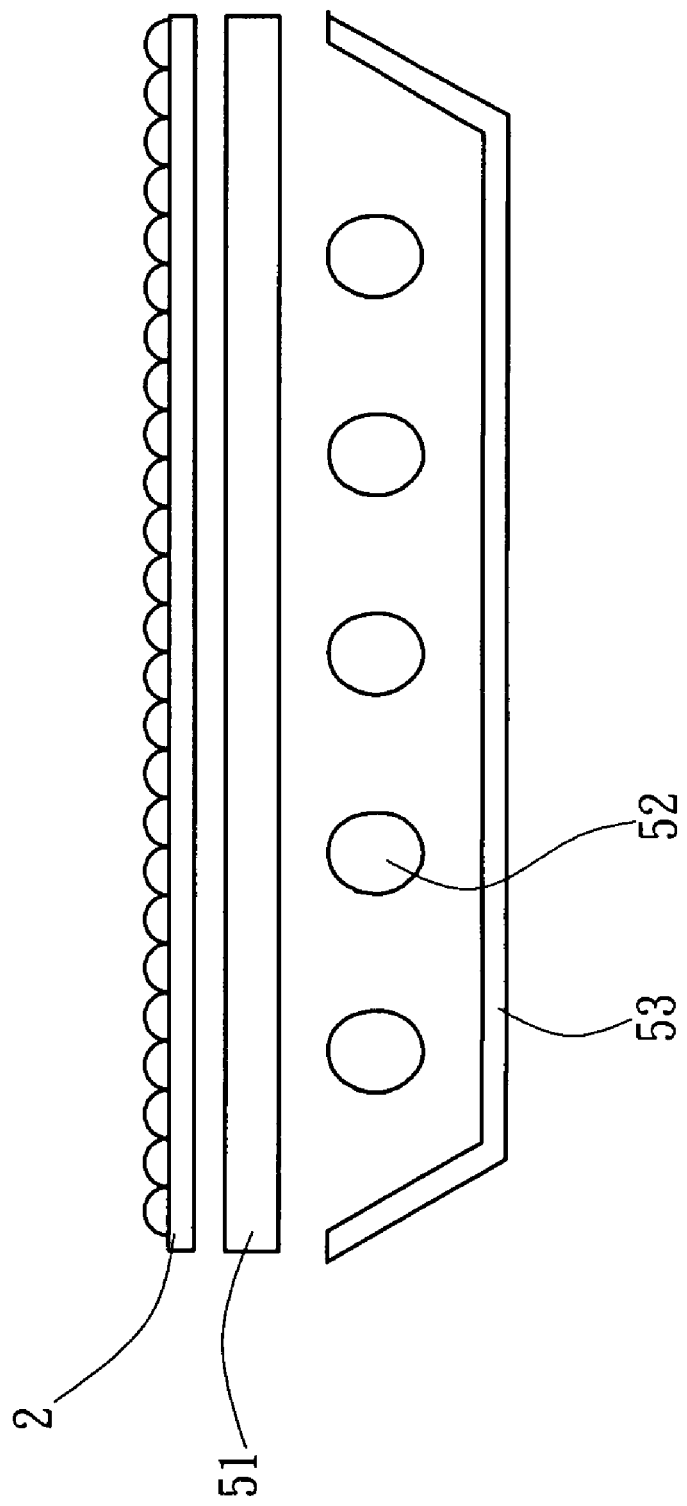
FIG. 5 is a perspective view showing a backlight module according to a first embodiment of the present invention.

Referring to FIG. 5, it is a perspective view showing a direct-type backlight module using the optical component of the present invention. The backlight module 5 includes a diffusion plate 51, a plurality of light sources 52, a reflective bowl 53 and the optical component 2 shown in FIG. 2. In the embodiment, the light source 52 is, but not limited to, a flat fluorescent lamp (FFL), an external electrode fluorescent lamp (EEFL), a hot cathode fluorescent lamp (HCFL), a cold cathode fluorescent lamp (CCFL) or a light emitting diode (LED). The light sources 52 are disposed in the reflective bowl 53. The reflective bowl 53 reflects lights emitted by the light sources 52 to the diffusion plate 51. The diffusion plate 51 diffuses the lights emitted by the light sources 52. The diffusion plate 51 mainly consists of a transparent material such as polymethyl methacrylate, polycarbonate or polyethylene terephthalate. And, there is a plurality of light diffusion particles (not shown) spread in the diffusion plate 51. The refractive index of the light diffusion particles is different from that of the transparent material of the diffusion plate 51; hence, the optical path will be bent when the light pass through the light diffusion particles so as to achieve the light diffusion effect.

In FIG. 5, the backlight module 5 is a direct-type backlight module, but the optical component 2 of the present invention can be adapted for other types of backlight modules, for example, a side-type backlight module. In the side-type backlight module, the optical component 2 is disposed above a light guide plate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

We claim:

1. An optical component having a light exit surface and a light entrance surface on which at least one light source emitting lights to generate at least one optical path in the optical component is disposed, the optical component comprising:
    a plurality of microstructures, extended along a first direction and arranged along a second direction on the light exit surface, each of the microstructures having a top, the tops disposed on the light exit surface to form a plurality of first curves and a plurality of second curves adjacent to each other, the first curves and the second curves being extended along the first direction, said first curves being not parallel with said second curves such that a distance between one of the first curves and one of the second curves in the second direction is not equal, and a distance between said one of the second curves and another of said first curves in the second direction is not equal; and
    a plurality of reflecting members, each of the reflecting members extended along the first direction and arranged along the second direction on the light entrance surface, and the position of each of the reflecting members being among two microstructures, each of the reflecting members to the light entrance surface having a thickness t, a length of the microstructure in the second direction being a width P, the optical component having a refractive index n, and t, P and n satisfy a formula of $\tan^{-1}(P/(10t)) > \sin^{-1}(1/n)$;
    wherein the optical path is incident from the light entrance surface, and the optical path is controlled by the thickness of the reflecting members and converged by the microstructures on the light exit surface.

2. The optical component of claim 1, wherein a cross-sectional outline of the microstructure in the second direction is an arc, a radius of curvature R of the arc and a distance D between said one of said first curves and said one of said second curves in the second direction satisfy a formula of $0.5R < D < 3R$.

3. The optical component of claim 1, wherein a focal length FD of the microstructure and the width P of the bottom of the microstructure satisfy a formula of $0.25 < FD/P < 2.4$.

4. A manufacturing method of an optical component adapted to manufacture the optical component of claim 1, the manufacturing method comprising:
    providing a transparent substrate, and forming a forming resin on one surface of the transparent substrate;
    providing a mold having a surface with a plurality of forming patterns disposed thereon, a shape of the forming patterns being corresponding to that of the microstructures of the optical component;
    impressing on the forming resin by the mold, and curing the impressed forming resin to form the microstructures;
    forming a photoresist layer on another surface of the transparent substrate;
    performing an exposure and development process for the photoresist layer to form a structure area, and removing the photoresist layer except the photoresist layer of the structure area;
    forming a reflecting material layer over the structure area; and
    removing the photoresist layer of the structure area and the reflecting material layer above the structure area to form the reflecting members.

5. The manufacturing method of claim 4, wherein the reflecting material layer comprises titanium dioxide ($TiO_2$) or magnesium oxide (MgO).

6. The manufacturing method of claim 4, wherein the forming resin comprises an ultraviolet-setting resin or a thermo-setting resin.

7. The manufacturing method of claim 4, wherein the transparent substrate comprises a material selected from the group consisting of polymethyl methacrylate, polycarbonate and polyethylene terephthalate.

8. A backlight module comprising:
at least one optical sheet;
at least one light source, disposed beside one side of the optical sheet, the light source emitting lights to generate at least one optical path;
an optical component having a light exit surface and a light entrance surface, the light entrance accepting the optical path, the optical component comprising:
 a plurality of microstructures, extended along a first direction and arranged along a second direction on the light exit surface, each of the microstructures having a top, the tops disposed on the light exit surface to form a plurality of first curves and a plurality of second curves adjacent to each other, the first curves and the second curves being extended along the first direction, said first curves being not parallel with said second curves such that a distance between one of said first curves and one of said second curves in the second direction is not equal, and a distance between said one of said second curves and another of said first curves in the second direction is not equal; and
 a plurality of reflecting members, each of the reflecting members extended along the first direction and arranged along the second direction on the light entrance surface, and the position of each of the reflecting members being among two microstructures, each of the reflecting members to the light entrance surface having a thickness t, a length of the microstructure in the second direction being a width P, the optical component having a refractive index n, and t, P and n satisfy a formula of $\tan^{-1}(P/(10t)) > \sin^{-1}(1/n)$;
wherein the optical path is incident from the light entrance surface, and the optical path is controlled by the thickness of the reflecting members and converged by the microstructures on the light exit surface.

9. The backlight module of claim 8, wherein the optical sheet comprises a diffusion plate or a light guide plate.

10. The backlight module of claim 8, wherein the light source is selected from the group consisting of a flat fluorescent lamp, an external electrode fluorescent lamp, a hot cathode fluorescent lamp, a cold cathode fluorescent lamp and a light emitting diode.

* * * * *